United States Patent [19]
Kinoshita

[11] Patent Number: 5,554,890
[45] Date of Patent: Sep. 10, 1996

[54] IGNITION CIRCUIT FOR A SQUIB IN AN AIR BAG IN A VEHICLE

[75] Inventor: Kenichi Kinoshita, Kako-gun, Japan

[73] Assignees: Fujitsu Ten Limited, Kobe; Toyota Jidosha Kabushiki Kaisha, Toyota, both of Japan

[21] Appl. No.: 207,748

[22] Filed: Mar. 9, 1994

[30] Foreign Application Priority Data

Mar. 16, 1993 [JP] Japan ................................. 5-055797

[51] Int. Cl.⁶ ..................................... H02J 1/06
[52] U.S. Cl. .......................... 307/10.1; 307/9.1; 307/110; 180/271; 363/59; 280/728.1; 340/436; 340/669
[58] Field of Search .................... 307/9.1–10.1, 307/110; 180/271, 282; 363/59; 280/728.1, 734, 735; 123/198 R, 198 D; 340/436, 438, 669

[56] References Cited

U.S. PATENT DOCUMENTS

| | | | |
|---|---|---|---|
| 3,753,001 | 8/1973 | Hiroshima et al. | 307/10.1 |
| 4,451,743 | 5/1984 | Suzuki et al. | 307/110 |
| 5,023,468 | 6/1991 | Drobny et al. | 307/10.1 |
| 5,095,223 | 3/1992 | Thomas | 307/110 |
| 5,135,254 | 8/1992 | Masegi et al. | 280/735 |
| 5,320,382 | 6/1994 | Goldstein et al. | 280/735 |
| 5,373,193 | 12/1994 | Nilsson | 307/10.1 |
| 5,418,402 | 5/1995 | Fujiwara | 307/10.1 |
| 5,432,385 | 7/1995 | Kincaid et al. | 307/10.1 |

FOREIGN PATENT DOCUMENTS

| | | |
|---|---|---|
| 0339967 | 11/1989 | European Pat. Off. . |
| 0421574 | 4/1991 | European Pat. Off. . |
| 4-24145 | 1/1992 | Japan . |
| WO93/17893 | 9/1993 | WIPO . |

Primary Examiner—William M. Shoop, Jr.
Assistant Examiner—Peter Ganjoo
Attorney, Agent, or Firm—Oliff & Berridge

[57] ABSTRACT

An object of the present invention is provide an ignition circuit for a squib in an air bag in a vehicle able to supply sufficient energy to ignite the squib which does not use converter or a high capacity capacitor.

The first capacitor 12 and the second capacitor 13 are charged by the battery 11. The sensor 17 is closed and the control circuit 10 makes the NPN type transistor 19 active when a collision is detected. The squib 16 is connected to the junction of the first capacitor 12 and the second capacitor 13 so that sufficient energy can be supplied to the squib even when a converter is not used.

7 Claims, 4 Drawing Sheets

IGNITION CIRCUIT FOR A SQUIB IN AN AIR BAG IN A VEHICLE

BACKGROUND OF THE INVENTION

1. Field of the Invention

The present invention relates to an ignition circuit for a squib in an air bag in a vehicle, especially to an ignition circuit for a squib which can boost the energy supplied to the squib.

2. Description of the Related Art

Recently, vehicles generally contain air bag systems to protect drivers and passengers. In the air bag system, a squib is ignited by a current supplied from a battery when a collision is detected by the sensor arranged behind the head light of the vehicle. Gaseous nitrogen is generated by the squib, and an air bag which is installed in the steering wheel of the vehicle is quickly inflated.

As the air bag is required to function without fail when a collision is detected, it is recommended that an air bag system contain a backup capacitor storing sufficient energy to ignite the squib if the battery voltage should fall.

It is, however, required that a current above a threshold level is continuously supplied for a predetermined threshold period. Therefore, the energy stored in the backup capacitor (hereinafter referred to as the capacitor) must be more than a threshold amount. It is, therefore, required that the capacity of the capacitor must be larger, or the voltage applied to the capacitor must be higher.

However, more space is required to mount a large capacitor on the vehicle, or a DC-DC converter for increasing the battery voltage (hereinafter referred to as the converter) is required.

The addition of a converter to the air bag system, however, makes the system expensive, because the converter is expensive, and the noise generated by the converter affects other electronic circuits.

SUMMARY OF THE INVENTION

Therefore, an object of the present invention is to provide an ignition circuit, for a squib in an air bag in a vehicle, able to supply sufficient energy to ignite the squib which does not use a converter or a large capacity capacitor.

According to one aspect of this invention, there is to provided an ignition circuit for a squib in an air bag in a vehicle comprising a battery; a first capacitor which is charged by the battery; a second capacitor which is connected in parallel with the first capacitor, and charged by the battery; an igniting means which connects the first capacitor and the second capacitor in series, and supplies electric energy charged in the first capacitor and the second capacitor to the squib when a collision of the vehicle is detected.

According to another aspect of this invention, there is provided an ignition circuit for a squib in an air bag in a vehicle comprising a DC-DC converter for increasing the voltage from a battery, the negative electrode thereof being grounded; a first capacitor, the positive electrode thereof being applied to a positive electrode of the DC-DC converter, and the negative electrode thereof being grounded; a second capacitor, the positive electrode thereof being applied to the positive electrode of the DC-DC converter via a positive side current limiting resistor, and the negative electrode thereof being grounded via a negative side current limiting resistor; a squib, one terminal thereof being applied to a positive electrode of the DC-DC converter via a sensor which mechanically closes when the sensor detects a collision, and another terminal thereof being applied to a negative electrode of the second capacitor; a sub-switch which connects the other terminal of the squib to ground via a negative voltage protecting diode when the sub-switch closes; a main switch which connects the positive electrode of the second capacitor to ground when the main switch closes; and a control circuit which causes the sub-switch to close when the control circuit detects a collision, and the main switch closes when a predetermined period has elapsed after the sub-switch is closed.

BRIEF DESCRIPTION OF THE DRAWINGS

The present invention will be more clearly understood from the description set forth below with reference to the accompanying drawings.

DESCRIPTION OF THE PREFERRED EMBODIMENTS

Figure 1:
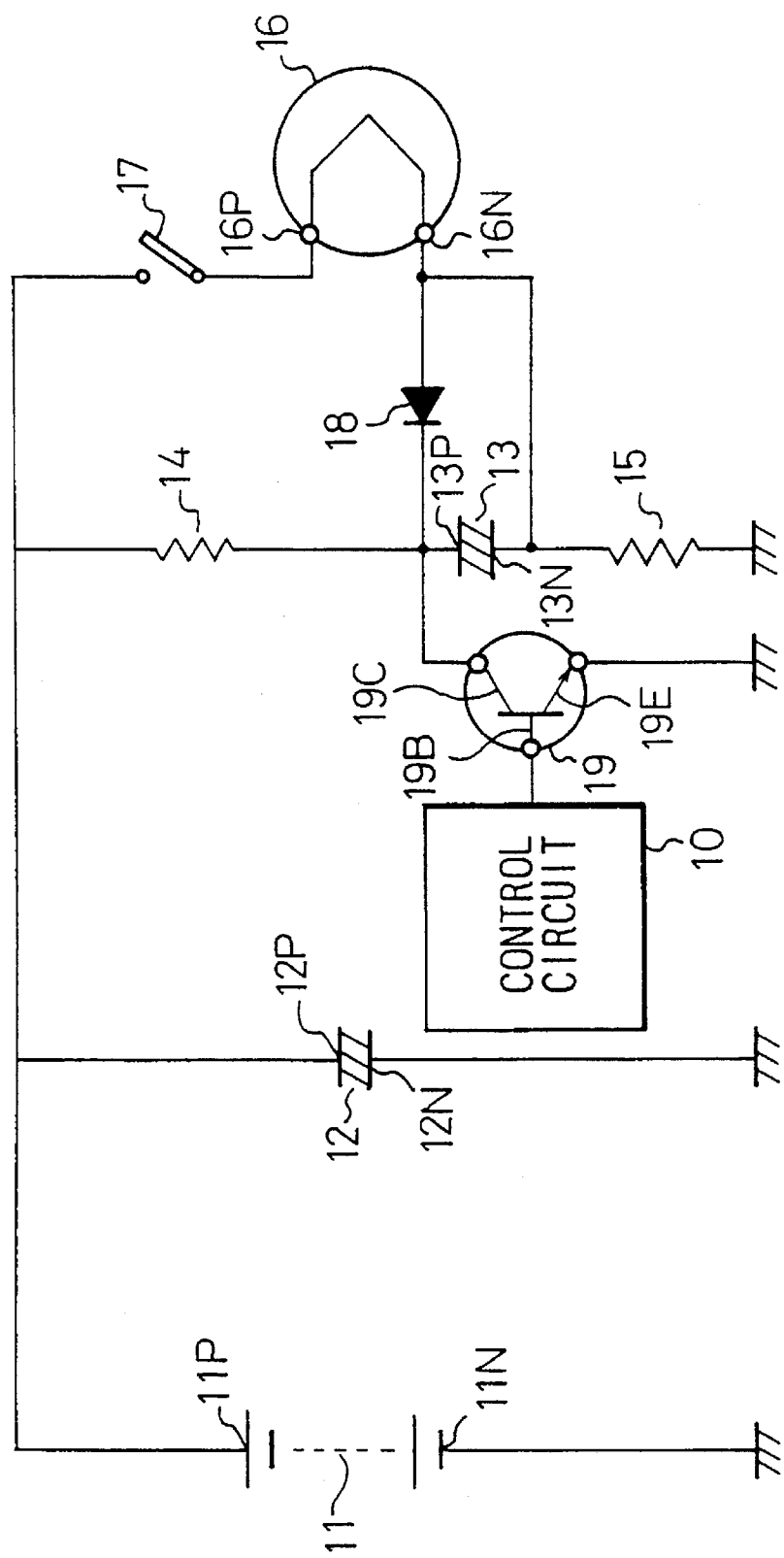
FIG. 1 is the circuit diagram of the embodiment according to the first invention.

FIG. 1 is a circuit diagram of the first embodiment of an ignition circuit of a squib in an air bag for a vehicle according to the first invention, and a battery 11 is charged by an alternator (not shown) driven by an engine (not shown). Note, a negative electrode 11N is grounded to the body of the vehicle.

A positive electrode 12P of the first capacitor 12 is connected to a positive electrode 11P of the battery 11, and a negative electrode 12N is grounded.

A positive electrode 13P of the second capacitor 13 is connected to a positive electrode 11P of the battery 11 via a positive side current limiting resistor 14, and a negative electrode 13N is grounded via a negative side current limiting resistor 15.

One terminal 16P of the squib 16 is connected to the positive electrode lip of the battery 11 via a sensor 17, and another terminal 16N is connected to the negative electrode 13N of the second capacitor 13. Note, the sensor is a mechanical switch which is closed by a collision, and prevents the air bag from expanding if the control circuit 10 malfunctions.

Between terminal 16N of the squib 16 and the positive electrode 13P of the second capacitor 13, a diode 18 is arranged, and its anode is connected to terminal 16N of the squib 16 and its cathode is connected to the positive electrode 13P of the second capacitor 13.

An NPN type transistor 19 functions as a switch to ground the positive electrode 13P of the second capacitor 13. The collector 19C of the transistor is connected to the positive electrode 13P of the second capacitor 13, the emitter 19E is grounded and the base 19B is connected to the control circuit 10.

The control circuit 10 is constructed, for example, as a microcomputer system, and supplies a bias voltage to make the NPN type transistor 19 active.

Figure 2A:
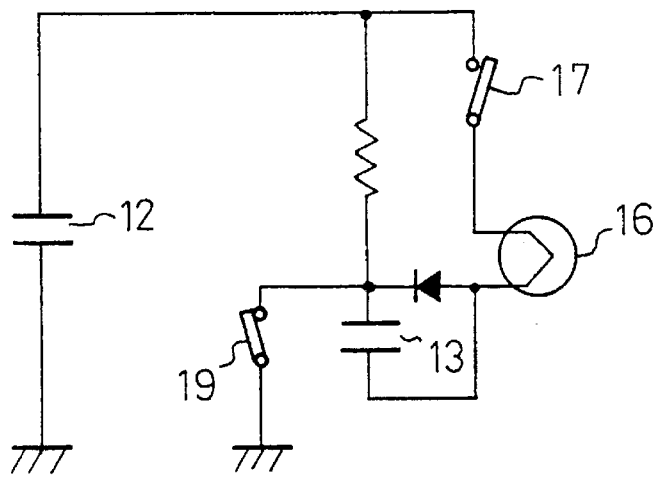
FIG. 2a to 2c are the equivalent circuit diagrams to explain the mode of operation of the embodiment according to the first invention.
Figure 2B:
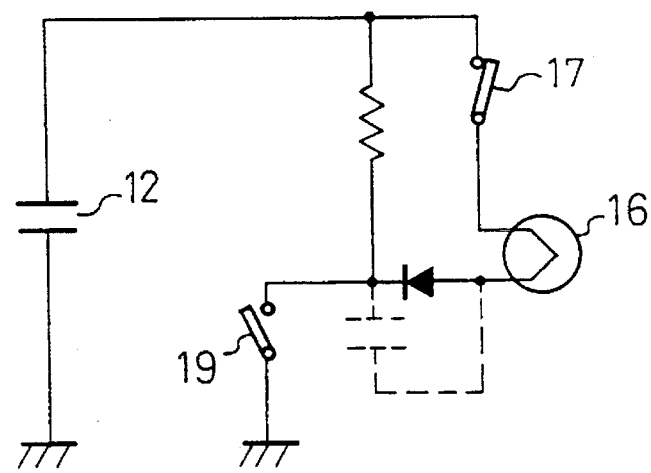
Figure 2C:
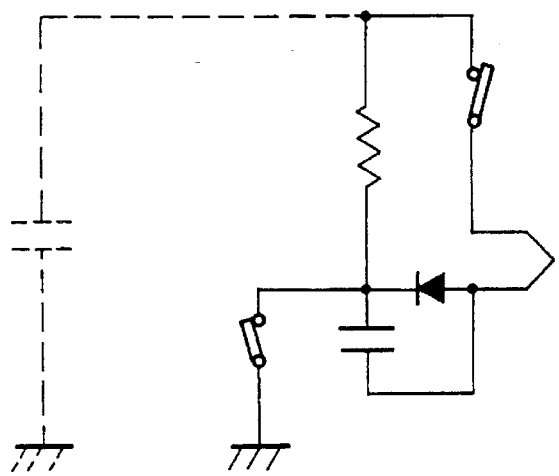

FIG. 2a to 2c are equivalent circuit diagrams to explain the mode of the operation of the first invention. FIG. 2a shows the case when both the first capacitor 12 and the second capacitor 13 are normal, FIG. 2b shows the case when the second capacitor 13 fails to discharge, and FIG. 2c shows the case when the first capacitor 12 fails to discharge. Note, dotted lines show failing capacitors.

In the case where both the first capacitor 12 and the second capacitor 13 operate normally, the first capacitor 12 and the second capacitor 13 are connected in series when both the sensor 17 is closed and the NPN type transistor 19 is made active, and about double the voltage of the battery is supplied to the squib 16.

In the case of the second capacitor 13 failing to discharge, a by-pass circuit is formed by the diode 18, and energy stored in the first capacitor 12 is supplied to the squib 16.

In the case of the first capacitor 12 failing to discharge, energy stored in the second capacitor 13 is supplied to the squib 16.

Note, it is clear that voltage can be supplied to the squib 16, when either the first capacitor 12 or the second capacitor 13 fails to discharge.

According to the first embodiment, therefore, it is possible to supply sufficient energy to the squib without the converter which generates noise, and when any one of 10 the two capacitors fails.

Figure 3:
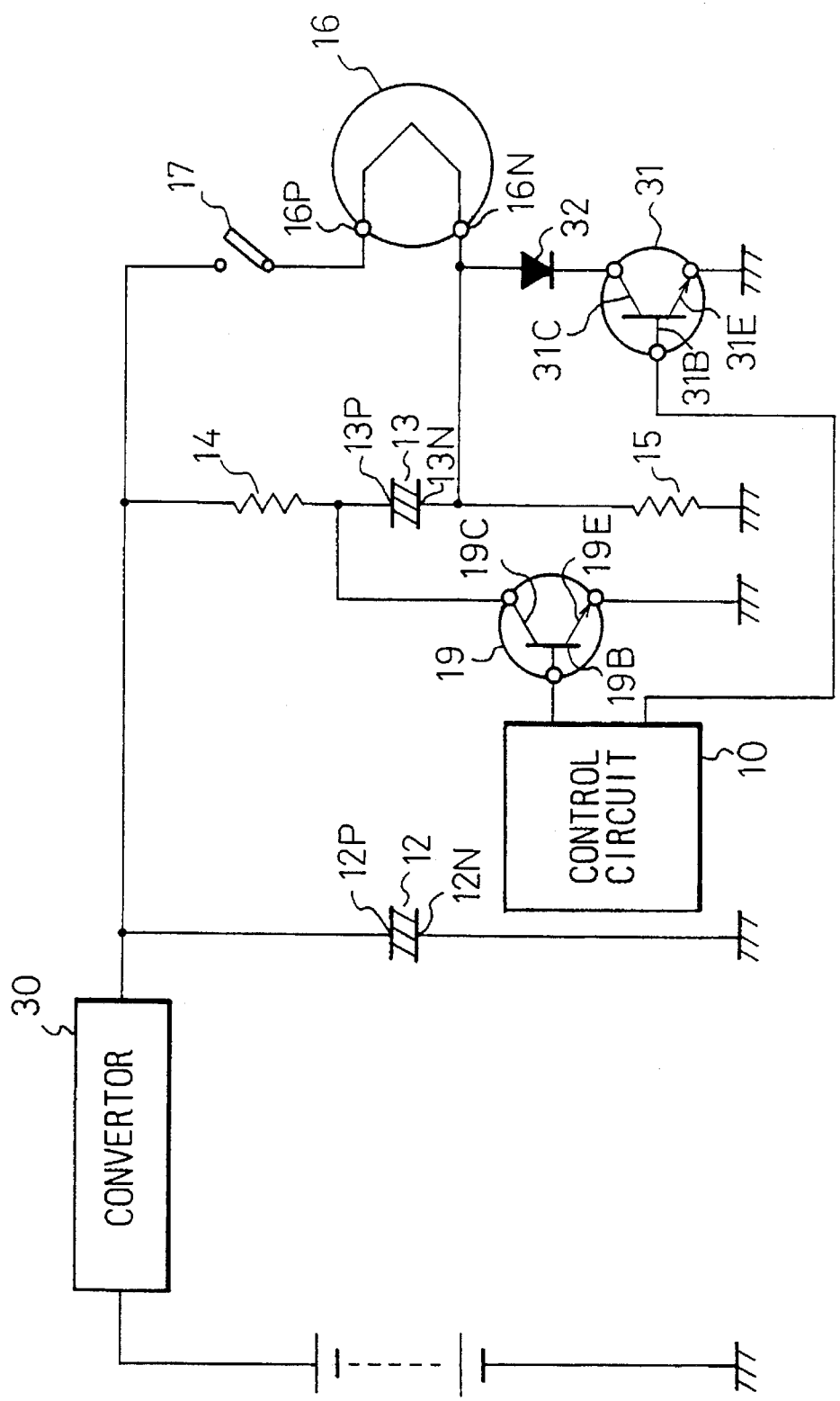
FIG. 3 is the circuit diagram of the embodiment according to the second invention.

FIG. 3 is a circuit diagram of a second embodiment of an ignition circuit for the squib in the air bag in a vehicle and the same constituents as in the first embodiment shown in FIG. 1 are given same reference number, and only points of difference only are explained.

That is, the battery 11 is connected to the converter 30 to increase the voltage and supply energy to the igniter circuit.

An electrode 16N of the squib 16 is connected to the collector 16C of the second NPN type transistor 31 via a negative voltage protecting diode 32.

That is, the anode of the diode 32 is connected to a terminal 16N of the squib 16, and its cathode is connected to the collector 31C of the second NPN type transistor 31. The emitter of the second NPN type transistor 31 is grounded and its base 31B is connected to the control circuit 10.

The control circuit 10 makes the second NPN type transistor 31 active just after it detects a collision and the NPN type transistor 19 becomes active after a predetermined period elapses.

Figure 4:
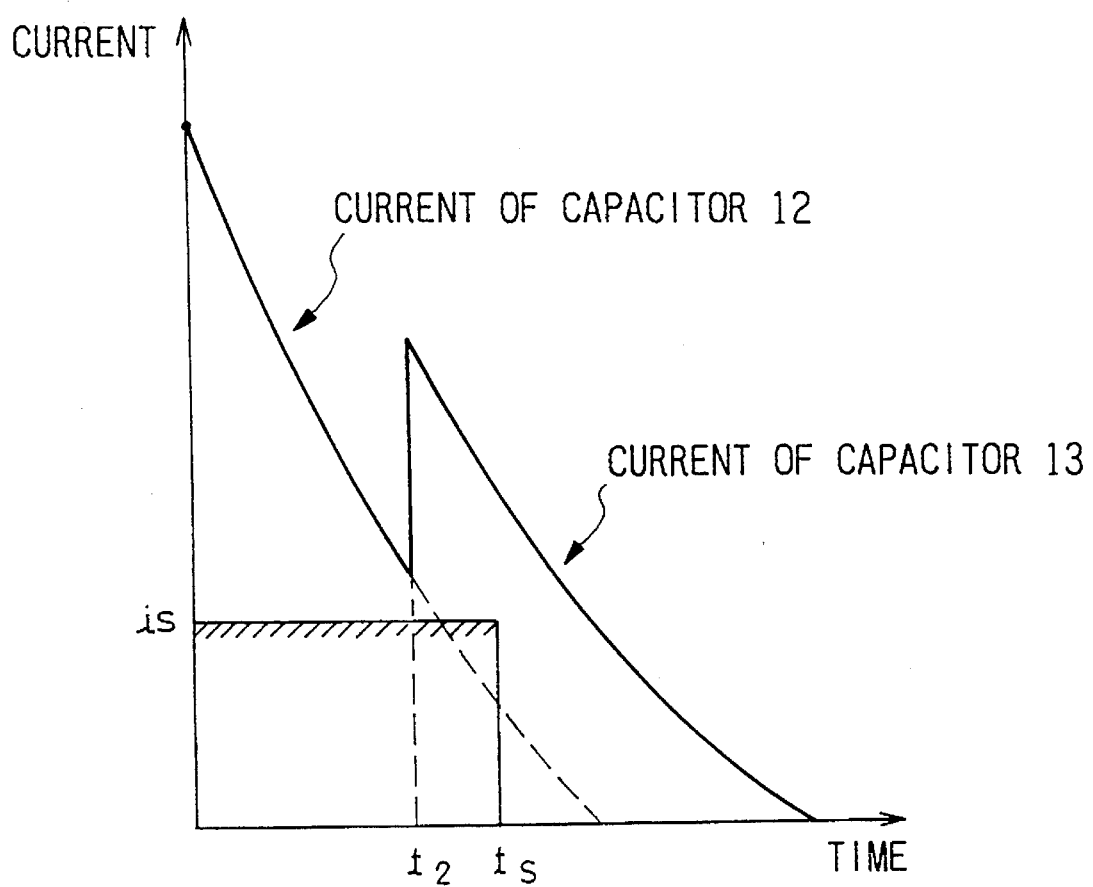
FIG. 4 is the timing diagram of the embodiment according to the second invention.

FIG. 4 is the timing diagram according to the second invention in which the abscissa shows time and the ordinate shows current through the squib 16.

Note, it is required that a current greater than $i_s$ flow for the period $t_s$ to secure ignition.

In the second embodiment, voltage is increased by the converter to supply sufficient energy to the first capacitor 12 and the second capacitor when capacity of the first capacitor 12 and the second capacitor are relatively small.

Energy stored in the first capacitor 12 is supplied to the squib 16 when the switch 17 is closed and the second NPN type transistor 31 is made active just after a collision is detected.

As the amount of energy stored in the first capacitor 12 is not sufficient to supply sufficient current over a sufficient period to ignite the squib 16, the control circuit 10 makes the NPN type transistor 19 active to supply energy stored in the second capacitor 13 after the predetermined period $t_s$ elapses after a collision is detected.

Therefore, energy stored in the second capacitor 13 is added to the energy stored in the first capacitor, and the squib 16 is securely ignited.

According to the second embodiment, therefore, it is possible to supply sufficient energy to the squib by suitably timing the discharge of the two capacitors.

In a third embodiment, the more the battery voltage falls, the more the period between the timing of the discharge of the first capacitor and the timing of the discharge of the second capacitor is decreased.

According to the third embodiment, therefore, it is possible to make more secure the ignition of the squib by controlling the timing of the discharge of the second capacitor.

I claim:

1. An ignition circuit for a squib in an air bag in a vehicle, comprising
   a battery;
   a first capacitor which is charged by said battery;
   a second capacitor which is connected in parallel with said first capacitor, and charged by said battery;
   a sensor that detects a collision of the vehicle; and
   an igniting means which connects said first capacitor and said second capacitor in series, and supplies electric energy charged in said first capacitor and said second capacitor to said squib when the collision of said vehicle is detected by the sensor.

2. An ignition circuit for a squib in an air bag in a vehicle, comprising:
   a battery, a negative electrode thereof being grounded;
   a first capacitor, a positive electrode thereof being applied to a positive electrode of the battery, and a negative electrode thereof being grounded;
   a second capacitor, a positive electrode therefore being applied to the positive electrode of the battery via a positive side current limiting resistor, and a negative electrode thereof being grounded via a negative side current limiting resistor;
   a squib, a first terminal thereof being applied to the positive electrode of the battery via a sensor which mechanically closes when the sensor detects a collision, and a second terminal thereof being applied to the negative electrode of the second capacitor;
   a diode, an anode thereof being applied to the second terminal of the squib and a cathode thereof being applied to the positive electrode of the second capacitor;
   a main switch which causes the positive electrode of the second capacitor to be grounded when the main switch closes; and
   a control circuit which causes the main switch to close when the control circuit detects a collision.

3. An ignition circuit for a squib in an air bag in a vehicle, comprising:
   a DC-DC converter for increasing a voltage of a battery, a negative electrode thereof being grounded;
   a first capacitor, a positive electrode thereof being applied to a positive electrode of the DC-DC converter, and a negative electrode thereof being grounded;
   a second capacitor, a positive electrode thereof being applied to the positive electrode of the DC-DC converter via a positive side current limiting resistor, and a negative electrode thereof being grounded via a negative side current limiting resistor;

a squib, a first terminal thereof being connected to the positive electrode of the DC-DC converter via a sensor which mechanically closes when the sensor detects a collision, and a second terminal thereof being applied to the negative electrode of the second capacitor;

a sub-switch which causes the second terminal of the squib to be connected to ground via a negative voltage protecting diode when the sub-switch closes;

a main switch which causes the positive electrode of the second capacitor to be connected to ground when the main switch closes; and a control circuit which causes the sub-switch to close when the control circuit detects a collision, and the main switch to close when a predetermined period of time has elapsed after the sub-switch has closed.

4. An ignition circuit for a squib in an air bag in a vehicle according to claim 3, wherein the more the battery voltage falls, the more the predetermined period of time is decreased.

5. A method for igniting a squib for an air bag of a vehicle, comprising the steps of:

(1) storing electric power in a first capacitor, a positive electrode thereof being applied to a positive electrode of a battery, and a negative electrode thereof being grounded;

(2) storing electric power in a second capacitor, a positive electrode thereof being applied to the positive electrode of the battery via a positive side current limiting resistor, and a negative electrode thereof being grounded via a negative side current limiting resistor;

(3) supplying electric power to a squib, a first terminal thereof being applied to the positive electrode of the battery via a sensor which mechanically closes when the sensor detects a collision, and a second terminal thereof being applied to the negative electrode of the second capacitor;

(4) blocking an electric current which flows from the squib to a positive electrode of the second capacitor by a diode, an anode thereof being applied to the second terminal of the squib and a cathode thereof being applied to the positive electrode of the second capacitor;

(5) causing the positive electrode of the second capacitor to ground when a main switch closes; and (6) causing the main switch to close when a control circuit detects a collision.

6. A method for igniting a squib for an air bag of a vehicle, comprising the steps of:

(1) increasing a voltage of a battery by a DC-DC converter, a negative electrode of the DC-DC converter being grounded;

(2) storing electric power supplied from the DC-DC converter in a first capacitor, a positive electrode of the first capacitor being applied to a positive electrode of the DC-DC converter, and a negative electrode of the first capacitor being grounded;

(3) storing electric power supplied from the DC-DC converter in a second capacitor, a positive electrode of the second capacitor being applied to a positive electrode of the DC-DC converter via a positive side current limiting resistor, and a negative a electrode of the second capacitor being grounded via a negative side current limiting resistor;

(4) supplying electric power to a squib, a first terminal thereof being applied to the positive electrode of the DC-DC converter via a sensor which mechanically closes when the sensor detects a collision, and a second terminal thereof being applied to the negative electrode of the second capacitor;

(5) causing the second terminal of the squib to be connected to ground via a negative voltage protecting diode when a sub-switch closes;

(6) causing the positive electrode of the second capacitor to ground when a main switch closes;

(7) causing the sub-switch to close when a control circuit detects a collision; and (8) causing the main switch to close when a predetermined period of time has elapsed after the sub-switch has closed.

7. A method for igniting a squib for an air bag of a vehicle according to claim 6, wherein the more the battery voltage is lowered, the more the predetermined period of time is decreased.

* * * * *